July 24, 1962 J. F. DAVIN, JR 3,045,583
MACHINE FOR BALING
Filed Feb. 12, 1959 6 Sheets-Sheet 3

INVENTOR.
JOSEPH F. DAVIN, JR.
BY
ATTORNEY.

July 24, 1962  J. F. DAVIN, JR  3,045,583
MACHINE FOR BALING

Filed Feb. 12, 1959  6 Sheets-Sheet 4

INVENTOR.
JOSEPH F. DAVIN, JR.
BY

ATTORNEY.

July 24, 1962     J. F. DAVIN, JR     3,045,583
MACHINE FOR BALING
Filed Feb. 12, 1959     6 Sheets-Sheet 5

INVENTOR.
JOSEPH F. DAVIN, JR.
BY
ATTORNEY.

United States Patent Office 3,045,583
Patented July 24, 1962

3,045,583
MACHINE FOR BALING
Joseph F. Davin, Jr., Rte. 4, Box 585, Bakersfield, Calif.
Filed Feb. 12, 1959, Ser. No. 792,745
9 Claims. (Cl. 100—4)

This invention relates to the baling art and is illustratively disclosed herein as performed and embodied in a hay baler of the type which is towed behind a farm tractor while it bales.

A hay baler of this general type picks up the hay from a windrow into which it is headed and bales this while traveling, the bales being discharged rearwardly from the baler.

Various means have been employed in such balers to determine the length and density of bales produced, but difficulty has been experienced in attaining the ideal of having all the bales put up of a standard length and density.

It is an object of the present invention to provide a method and machine for baling in which all of the bales will be approximately of the same standard length and the same standard density.

Another object of the invention is to provide such a method and machine in which all the bales will be approximately of a fixed standard length and uniform in density but in which the density of the bales is adjustably determined.

A further object of the invention is to provide such a method and machine in which a baling chamber is provided which is approximately twice the precise length which each bale is desired to have, while still compressed, and in which each bale, after being formed, occupies the rear half of the baling chamber and constitutes a measure for the length of the next bale to be formed in the baler.

Yet another object of the invention is to provide such a baling machine in which the density of each new bale being formed must approximate the density of the measuring bale in order to trip the mechanism for tying the bale being formed.

The manner of accomplishing the foregoing objects as well as further objects and advantages will be made manifest in the following description taken in connection with the accompanying drawings in which

FIG. 13 is a view similar to FIG. 12 illustrating the retraction of the plunger of the baler of the invention which immediately follows the position of said plunger shown in FIG. 12 and the feeding of a new quantity of hay downwardly in the path of said plunger. This view also shows the ties wires which were being placed on the bale in FIG. 12 as now completely tied and illustrates the release of the pressure responsive mechanism at the discharge end of the baler from its pressural relation with the compression strut and secondary pressure plate which release occurs in timed relation and subsequently to the completion of the wire binding of the initial first bale. This results in the compression strut being released and falling downwardly and in the trap door under the second half of the baling chamber inclining downwardly as shown, and in the secondary pressure plate swinging away from the longitudinal path of the initial first bale in the baling chamber.

Referring specifically to the drawings the performance of the method of the invention and a preferred embodiment of the structure of the baling machine of the invention are illustrated in a hay baler 30. This baler is in the form of a trailer having a body 31 (FIG. 1) which is supported on wheels 32 and is drawn along the ground towed by a farm tractor and performs the functions of picking up hay from a windrow into which the baler is headed and baling this hay as it travels. Most of the details found in this general type of hay baler are also employed in the machine 30 but these are not shown in the drawings because they comprise no part of the present invention. These details include a motor for powering the baler, an elevator for picking up the hay from the ground, a transverse conveyor for delivering the hay over a hopper 33, mechanism for reciprocating a feed head 34 for pushing the hay downwardly through said hopper, transmission mechanism for rotating a pair of master gear wheels 35 which are connected by a pitman 36 to a baling plunger 37. Nor is the means shown for slidably mounting said plunger so that it may be freely reciprocated by rotation of the gear wheels 35 between its two extreme operating positions shown respectively in FIGS. 10 and 11.

As shown diagrammatically in FIGS. 10 to 16 inclusive, the baler 30 includes a frame 38 which extends horizontally rearwardly from the hopper 33 this frame forming a baling chamber 39 which is approximately twice the length of a standard bale, produced by the machine 30, before this bale is discharged from said chamber. The chamber 39 has a first half 45 and a second half 46 and a hay receiving end 47 and a bale discharge end 48. The receiving end 47 of chamber 39 is defined by the plunger 37 in its inwardmost extended position shown in FIG. 10. The position of the discharge end 48 of the chamber 39 is defined by a primary pressure plate 49 which is mounted on a pressure responsive mechanism 50 which is fixed on a shaft 51 pivotally mounted on the frame 38 at the rear end of the machine 30. Positioned at opposite sides of the first half 45 of the baling chamber 39 are pairs of pressure bars 52 which are vertically pivoted on vertical axes at their front ends on frame 38 and yieldably pressed inwardly at their rear ends to retard the rearward passage of hay into the first half 45 of the baling chamber 39 in the formation of a new bale.

Figure 10:
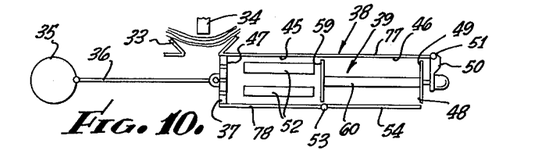
FIG. 10 is a diagrammatic operational view illustrating the invention at the start of a baling run with the secondary pressure plate disposed approximately at the midpoint in the baling chamber and with the latter otherwise empty.

Fixed on a shaft 53 pivotally mounted horizontally on the frame 38 just below the middle of baling chamber 39 is a trap door 54 which is normally held horizontally beneath the second half 46 of the baling chamber 39 as shown in FIG. 10. When forming an initial new bale in the machine 30, and only during that operation, a secondary pressure plate 59 is positioned with its front face approximately midway between the feed and discharge ends of the baling chamber 39 and this plate is connected by a compression strut 60 with the pressure responsive mechanism 50 at the point where the latter connects with the primary pressure plate 49.

Referring now to FIGS. 1 to 5 inclusive, the frame 38 is seen to comprise four longitudinal angle iron members 61, 62, 63, and 64 which extend rearwardly from the baling machine body 31. The angle iron members 63 and 64 extend rearwardly to a transverse plane which is just forward of the midpoint in the length of the baling chamber 39. The rear ends of these angle iron members are united with the angle iron members 61 and 62 by vertical angle iron members 65 and 66. The front section of frame 38 which embraces the first half 45 of baling chamber 39 is braced by diagonal braces 67 which extend from the upper ends of angle iron members 65 and 66 to angle iron members 63 and 64 near the points where the forward ends of the latter connect with the baling machine body 31.

The upper angle iron members 61 and 62 of the baling chamber frame 38 extend rearwardly to points just to the rear of the discharge end 48 of the chamber and the rear ends of these members are braced to the rear ends of lower frame angle iron members 63 and 64 by diagonal braces 68.

The connection between the upper ends of angle members 65 and 66 and the longitudinal frame members 61 and 62 is made by a transverse angle iron member 73 which rests upon and is welded to the members 61 and 62 and extends laterally short distances from these members to where the member 73 is welded to the upper ends of vertical frame members 65 and 66. In a similar manner the lower ends of vertical angle iron frame members 65 and 66 are connected to longitudinal frame members 63 and 64 by a transverse angle frame member 74 which is welded to the bottom faces of members 63 and 64 and extends laterally to engage and be welded to the lower ends of members 65 and 66.

Welded to the upper faces of upper longitudinal frame members 61 and 62 are heavy reinforcing flanges 75 and 76. Welded inside the upper flanges of longitudinal frame members 61 and 62 is an upper horizontal baling chamber wall 77 which runs the full length of said members. Welded on the lower flanges of the lower longitudinal frame members 63 and 64 is a bottom wall 78 for the first half of the baling chamber. Welded inside the lower flanges of upper longitudinal frame members 61 and 62 are semi-baling chamber side walls 79 which extend the full length of said members. Welded on the inside of vertical flanges of the lower longitudinal frame member 63 are semi-baling chamber side walls 80 which terminate at the middle of the baling chamber.

Resting on rear portions of the longitudinal upper frame members 61 and 62 and bolted thereto and to the reinforcing flanges 75 and 76 for longitudinal adjustment thereon are heavy angle iron members 81 and 82. Connecting the front ends of members 81 and 82 and welded thereto is an angle member 83. Overlying the latter member and welded to this and to the members 81 and 82 is a reinforcing yoke 84. Also connecting members 81 and 82 and welded thereto at its opposite ends is a bar 88. Welded centrally on the angle iron 83 within the yoke 84 is a housing 89 for a needle bearing 90 through which a heavy bolt 91 extends. (See FIG. 5). Just beneath the housing 89 the vertical web of the angle iron 83 is provided with a hole 92, the purpose of which will be made clear hereinafter.

Welded on the upper face of bar 88 in alignment with hole 92 is an inverted U-shaped bracket 93 which carries an adjustable stop 94, the purpose of which will be described later.

Resting on and welded to the yoke 84 and cross bar 88 are a pair of triangular plates 95 having aligned holes 96, the purpose of which will be later described.

Secured by welding to the rear extremities of the heavy iron members 81 and 82 are heavy bearings 97 in which the shaft 51 journals. This shaft has an axial extension 98 extending from the left end thereof and provided on its extremity with an arm 99.

Welded to shaft 51 is a horizontal plate 105 which is slotted to receive vertical plates 106, 107 and 108 which are welded to plate 105. Aligned holes are provided in upwardly extending portions of plates 106 and 107 and plate 108 for the reception of a shaft 109. Pivotally mounted on this shaft between plates 106 and 107 is a hub 110 and between plates 107 and 108 is a hub 111. Connected with hub 110 is a tubular toggle member 112 the opposite end of which has a hub 113 which houses a needle bearing 114 through which a heavy bolt 119 extends. A pair of heavy plates 120 have aligned apertures at their opposite ends which fit over extending ends of the bolts 91 and 119 to form a toggle member 121 which unites with the toggle member 112 to form a toggle 122.

Figure 5:
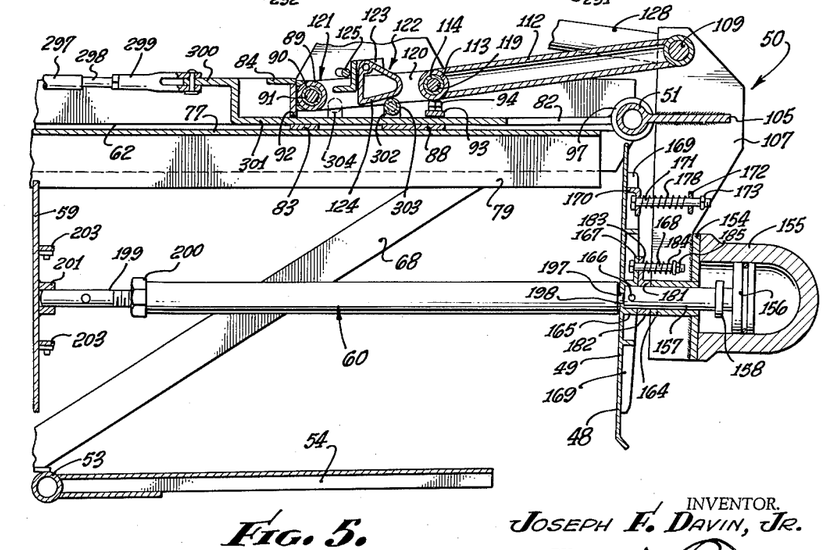
FIG. 5 is an enlarged longitudinal fragmentary vertical sectional view taken on the line 5—5 of FIG. 1 but illustrating the parts shown in this view positioned as at the point in the operation illustrated in FIG. 3, that is, during the operation of the wire binding means for binding the initial new bale formed at the start of a baling run.

This toggle, as shown in FIG. 5, is normally extended and in an over-center balanced position by virtue of the hub 113 resting on the adjustable stop 94. Means for breaking (or relaxing) toggle 122 include a bracket 123 welded on the plates 120 and having pivoted thereon a cam 124. The bracket 123 also has a rod 125 extending laterally from the toggle 122 and connected at its extremity by a contractile spring 126 with the bar 88 so as to bias the toggle 122 into locked position as shown in FIG. 5. When the toggle 122 is thus extended, it locks the pressure responsive mechanism 50 including the vertical plates 106 and 107 in the position in which these are shown in FIG. 5 with said plates extending downwardly from their connection with the horizontal plate 105 with a slight forward inclination.

Figures 1, 2:
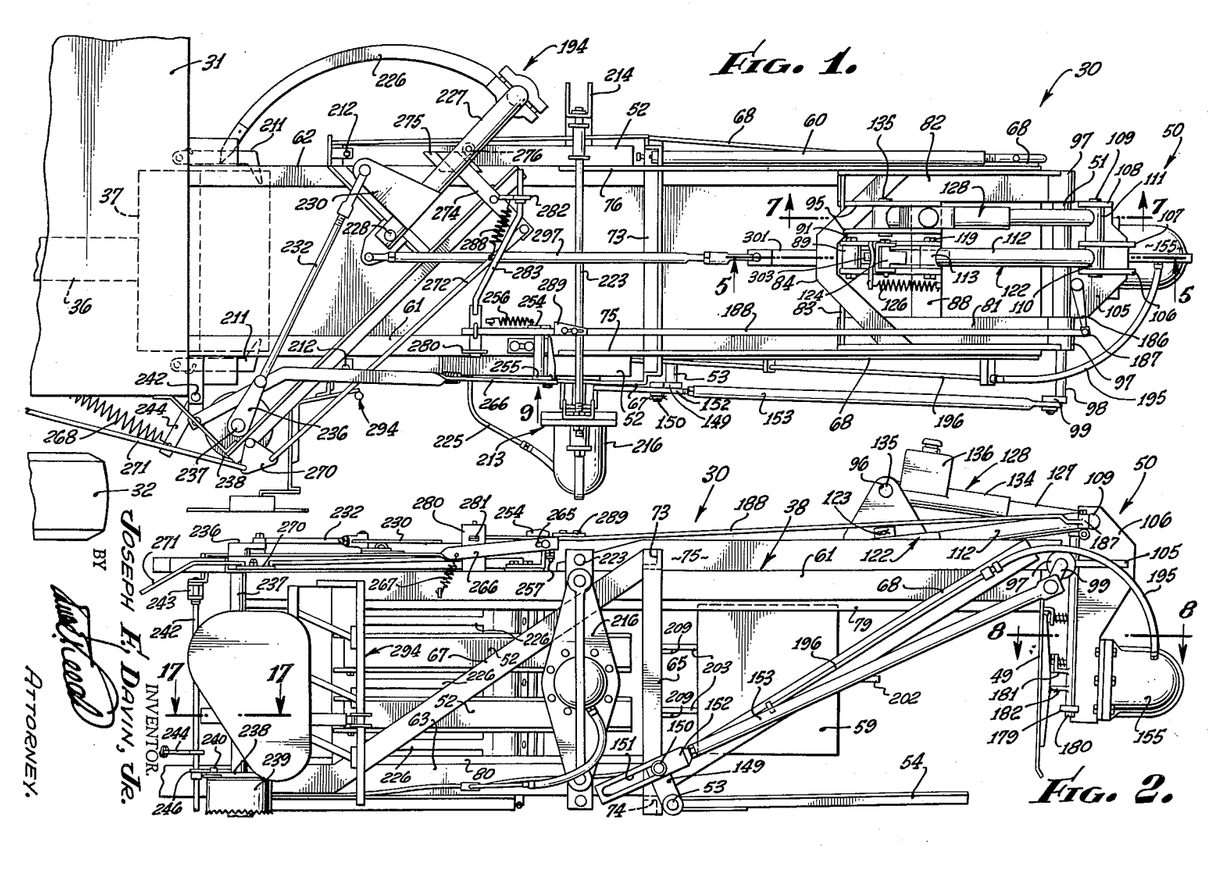
FIG. 1 is a fragmentary plan view of a preferred embodiment of the baling machine of the invention and shows the machine when it is empty and not being used.
FIG. 2 is a side elevation of FIG. 1.
Figures 6, 7, 8, 9:
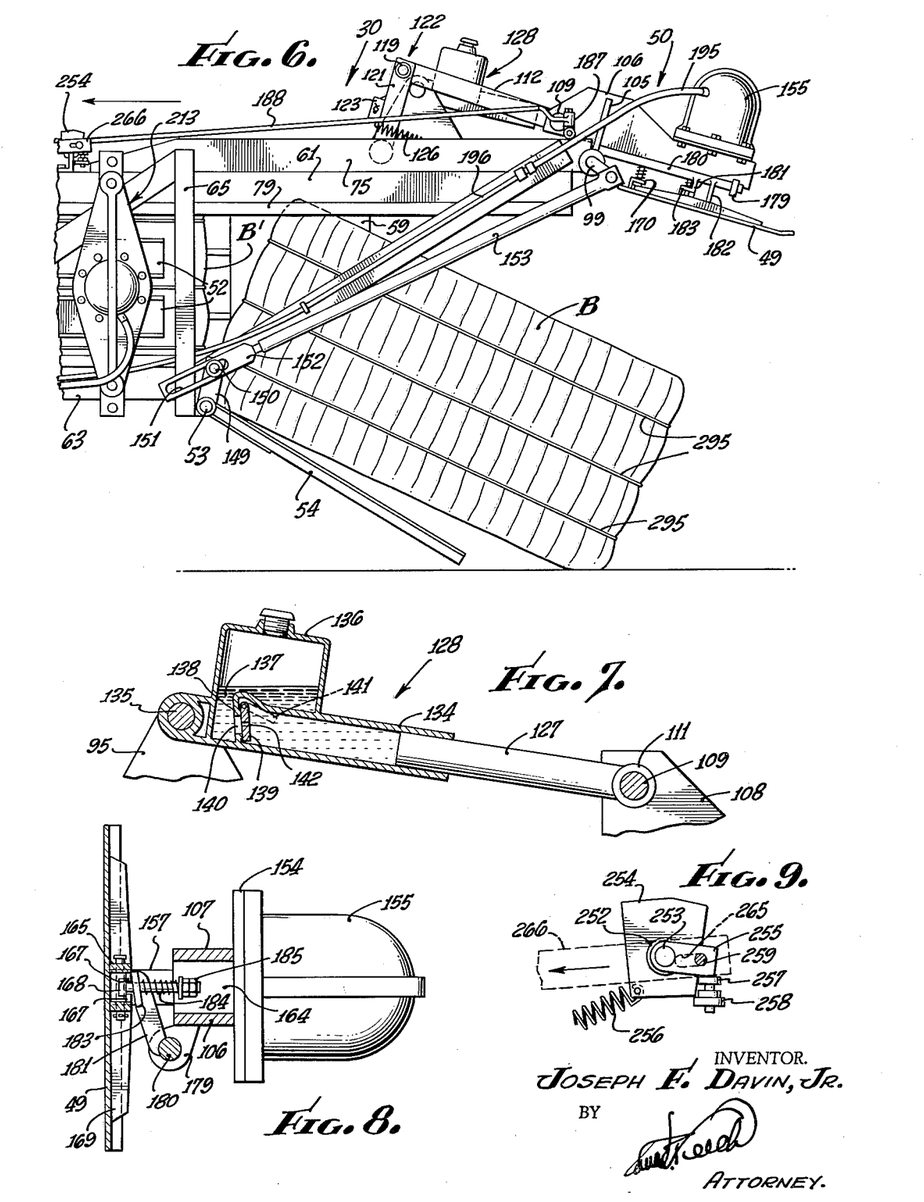
FIG. 6 is a fragmentary side elevational view of that portion of the baler of the invention which encloses the second half of the baling chamber and is taken at the point in the operation of the machine when a completely formed bale is discharged therefrom.
FIG. 7 is an enlarged vertical detailed sectional view taken on the lines 7—7 of FIG. 1 and illustrates the internal structure of the dash-pot shock absorber provided for retarding the rotation about its mounting shaft of the pressure responsive mechanism of the invention.
FIG. 8 is an enlarged detailed sectional view taken on the line 8—8 of FIG. 2 and illustrates the manner in which motion is transmitted from the pressure responsive means of the invention to trigger the operation of the wire binding mechanism.
FIG. 9 is an enlarged diagrammatic detailed view taken, looking in the direction of the arrow 9 in FIG. 1, of the trigger lock rocker shaft in trigger locking position, and shows the trigger lock link in broken lines.

As shown in FIGS. 1, 2 and 7, the hub 111 connects with a cylindrical piston 127 of a dash-pot 128, and this piston is slidably received by a cylinder 134 the opposite end of which has a shaft 135 which is pivotally received in the aligned apertures 96 in the plates 95.

Provided on the cylinder 134 near its upper end is an oil reservoir 136 which communicates through a passage 137 with the extreme upper end of said cylinder. Just below said passage a wall 138 is formed across said cylinder, this wall forming a valve seat for a flap type check valve 139 and having an aperture 140 through which liquid may freely flow when the flap valve 139 is opened in the position shown by broken lines 141. Provided in the flap valve 139 is a small escape aperture 142 through which a retarded flow of oil may take place when said valve is in its full-line closed position shown in FIG. 7. The dash-pot 128 is provided for retarding the rate of rotation of the pressure responsive mechanism 50 about its shaft 51 when, at the completion of the formation of a new bale in the baler 30, the toggle 122 is broken by lifting the toggle link 122 upwardly past dead center.

Figure 4:
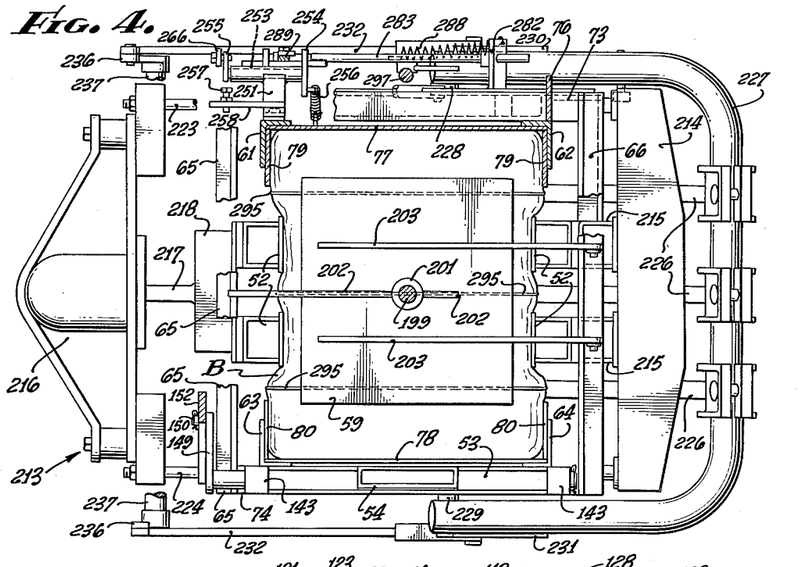
FIG. 4 is a transverse sectional view taken on the line 4—4 of FIG. 3 and shows the manner in which the secondary pressure plate measures the length of the initial bale formed in the machine during a given baling run.

Shaft 53, on which trap door 54 is fixed, journals in bearings 143 which are fixed on frame cross member 74 (FIG. 4). The left end of shaft 53 extends outwardly beyond the frame 38 and has fixed thereon an arm 149. A pin 150 extends outwardly from this arm and is received in a slot 151 formed in a head 152, a threaded end of which screws into an axial, tapped hole provided in the lower end of a link 153 the upper end of which pivotally connects with the extremity of arm 99 on shaft 51. In the normal position of the parts just mentioned, the pin 150 is located in the upper extremity of slot 151 thereby holding trap door 54 inclined slightly upward from horizontal as shown in FIG. 2. It is to be noted, however, that at this time the forward portion of trap door 54, where this connects with shaft 53, is located about one-half inch below the level of bottom wall 78 of the first half of the baling chamber.

Returning to the description of the pressure responsive mechanism 50 (see FIGS. 1, 2, 5 and 8) this also includes a cover plate 154 of a hydraulic cylinder 155 having a piston 156 mounted on a piston rod 157 having a stop 158 formed thereon and extending slidably through a cylindrical tube 164 formed integrally with the cover plate 154. As shown in FIGS. 5 and 8, the cover plate 154 is welded to back faces of mounting plates 106 and 107. Welded to the rear face of the primary pressure plate 49 at its center is a cylindrical cup 165 which receives the front end of the piston rod 157. Extending loosely through aligned holes in said cup walls and said piston rod is a bolt 166 which secures the pressure plate 49 on said rod. Extending upwardly from the cup 165 is a short slotted fork 167 into which a bolt 168 fits with the head of the bolt disposed forwardly of this fork and with the bolt extending rearwardly through the fork parallel with the piston rod 157. Also formed integral with the plate 49 and cup 165 are reinforcement flanges 169.

Welded to the plate 49 directly above the fork 167 is an angle lug 170 which is apertured and receives a bolt 171 which extends rearwardly through an aperture provided in a web 172 opposite ends of which are welded to the vertical plates 106 and 107. Lock nuts 173 are applied to the bolt 171 to the rear of web 172 and a coil spring 178 surrounds the bolt between the lug 170 and the apertured web 172 so as to form a loose yieldable connection between the web 172 and the primary pressure plate 49.

Welded on the lower end of plate 106 and extending outwardly therefrom is a bearing lug 179. Formed in this lug and in the horizontal plate 105 are aligned holes in which a control shaft 180 journals. Welded on this shaft are a pair of superimposed arms 181 and 182 which overlie and underlie the piston rod 157, in between the cup 165 and the tube 164. The arm 181 (FIG. 8) has an apertured lug 183 which extends upwardly from the inner extremity of this arm, the aperture in this lug matching with the opening in the fork 167 so as to receive the bolt 168. Coiled about the bolt 168 is an expansion spring 184 which is confined by lock nuts 185 applied to the rear end of bolt 168 thereby constantly biasing the lug 183 against the fork 167 of the pressure plate 49.

Fixed on the upper end of shaft 180 is an arm 186 on the end of which is mounted a swivel connection 187 through which this arm is connected to a push rod 188, and through which the pressure responsive mechanism 50 triggers a wire-binding mechanism 194, the details of which will be described hereinafter.

The space in the cylinder 155 behind the piston 156 is connected to a hose 195 and a metal tube 196 leading to a pressure controlled discharge of a pump (not shown) which is operated by the power unit on the baler 30.

The primary pressure plate 49 has a hole 197 formed therein concentric with the cup 165. This hole is provided for receiving a tit 198 formed coaxially on the rear end of the compression strut 60 when this strut and the secondary pressure plate 59 are being used in the operation of the baler 30 when forming an initial new bale at the start of a baling run.

Figure 3:
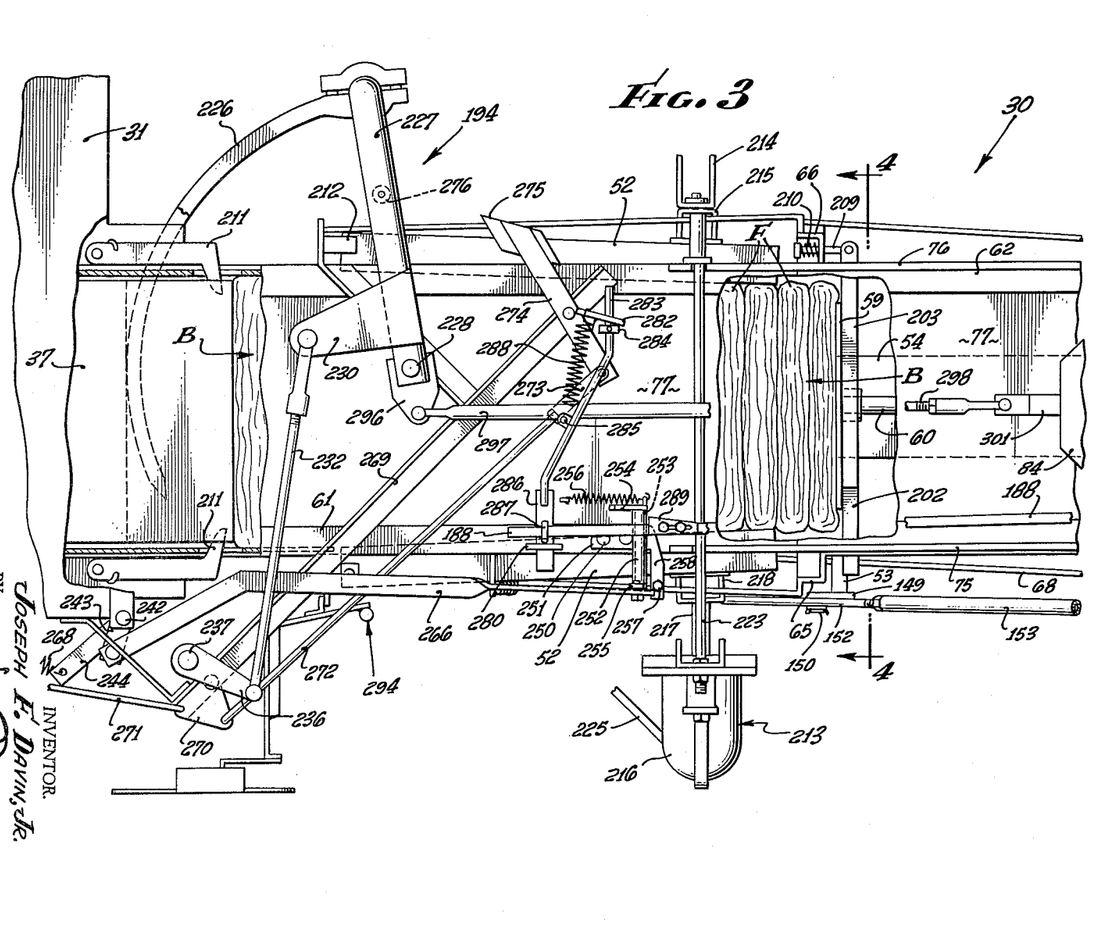
FIG. 3 is an enlarged plan view of a portion of said baler partially broken away to illustrate the first half of the baling chamber with an initial new bale being formed therein, and showing the wire binding mechanism with the parts thereof positioned as at the end of the first quarter of an operating cycle.

The strut 60 also has an adjustable threaded extension shaft 199 which screws into a tapped hole in the other end of the strut and is adjustably set by a lock nut 200. The front end of the strut 60 formed by the extension 199, when the strut is in use, fits into a cup 201 which is provided on the rear face of the secondary pressure plate 59. Plate 59 has a medial reinforcing bar 202 which extends horizontally in opposite directions from the cup 201, one end of this bar extending to the left so as to engage frame upright 65 when the plate 59 is in operative position and not under pressure. The plate 59 also has vertically spaced horizontal reinforcing bars 203 which extend to the right of the machine opposite the vertical frame member 66 on which they are mounted by eye bolts 209 which are spring biased forwardly by springs 210 so as to normally hold bars 203 against frame member 66 while the leftward extension of bar 202 engages vertical frame member 65 (see FIGS. 3, 4 and 5). The initial position of the plate 59 just described is accomplished by swinging it into transverse position, inserting the extension 199 of the strut 60 in the cup 201 and then shifting this strut to bring the tit 198 opposite the hole 197 into which it enters, thus supporting the strut at its opposite ends between the plates 59 and 49. It should be noted, however, that FIGS. 3, 4 and 5 show the plate 59 and strut 60 and plate 49 shifted a slight distance rearwardly incidental to actuation of the pressure responsive mechanism 50 triggering the bale wire-binding mechanism 194 to bind an initial new bale being formed at the start of a run in baler 30.

Each bale B formed in the baler 30 is made up of a series of flakes F of hay which are individually pressed into the receiving end 47 of the baling chamber 39. Two pairs of inwardly spring-urged jaws 211 are mounted on the frame alongside the entrance to the baling chamber and these jaws spring in behind each flake F and retain it in compressed relation with the other flakes delivered into the baling chamber as the plunger 37 withdraws to pick up another flake. As these flakes accumulate and advance rearwardly along the baling chamber they are engaged by the converging pressure bars 52 which are pivoted on the frame on pins 212 at their front ends and are yieldably held together by a hydraulic operated clamp 213 at the rear ends. This clamp includes a vertical beam 214 which is connected by spacers 215 with the pressure bars 52 on the right side of the baler, and a hydraulic cylinder 216 the piston rod 217 of which has a cross head 218 which unites with the pressure bars 52 on the left side of the baler. The upper and lower ends of the beam 214 and the upper and lower ends of the frame of the hydraulic cylinder 216 are connected together by rods 223 and 224 which extend entirely across the baler above and below the frame 38. The hydraulic cylinder 216 is connected by a hose 225 to the oil line running from the pressure pump above described.

Figure 17:
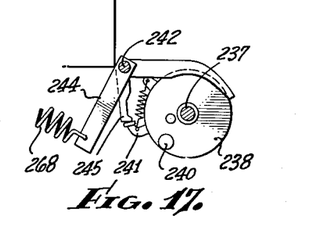
FIG. 17 is a diagrammatic horizontal sectional view taken on the line 17—17 of FIG. 2 and illustrates the clutch for actuating the wire binding mechanism of the baler and the trigger shaft for controlling said clutch at a time when the trigger is held in clutch disengaging position and the clutch is disengaged thereby.

Excepting for the means provided in baler 30 for triggering the bale wire-binding mechanism 194, the latter mechanism is of a type well known in the art and unnecessary details of this therefore are not shown in the drawings. This mechanism includes a series of three arcuate needles 226 clamped onto a U-shaped yoke 227 the upper and lower extremities of which are coaxially pivoted on stub shafts 228 and 229 provided on the frame 38 above and below the upper and lower baling chamber walls 77 and 78 respectively. The yoke 227 has actuating arms 230 and 231 which are connected by links 232 to arms 236 provided on upper and lower ends of a vertical clutch shaft 237 which journals in bearings provided on the frame 38. Shaft 237 carries a clutch 238 which is located just above a constantly rotating clutch drum 239. As shown in FIG. 17 the clutch 238 has a trigger resetting roller and a spring biased clutch actuating arm 241.

Figure 19:
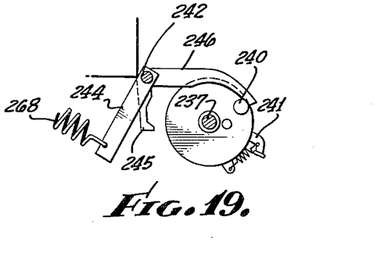
FIG. 19 is a view similar to FIG. 18 after the clutch has just completed a half revolution during which the trigger shaft control roller on the clutch engages an arm on the trigger shaft to rotate the latter in a counter-clockwise direction to reset the trigger in position to halt the cluch at the conclusion of a single complete revolution of the latter.
Figure 20:
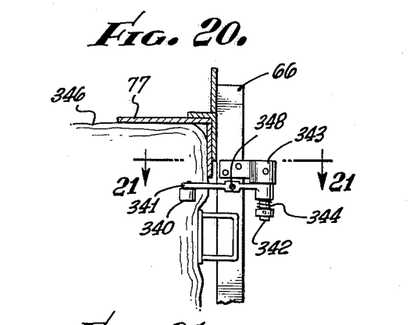
FIG. 20 is a diagrammatic fragmentary vertical sectional view of a control arm of a modified form of the baler of the invention.

Parallel with and close to the shaft 237 is a clutch trigger shaft 242 having an arm 243 at its upper end, and a spring arm 244, a trigger 245 and a cam arm 246 near its lower end. When the trigger 245 is located in the path of arm 241 as the latter rotates with the clutch 238, the arm 241 engages the trigger 244 and is shifted to disengage the clutch. The cam arm 246, on the other hand, is disposed in the horizontal plane of the roller 240 and is engaged by the latter when the clutch 238 starts rotating so as to reset the trigger 245 as shown in FIG. 19 in a position to be engaged by the clutch engaging arm 241 when a single revolution of the clutch is completed, provided the shaft 242 is held in the reset position transmitted to it by the cam arm 246 as shown in FIG. 19. The means for doing this will now be described.

Mounted by screws 250 on the upper frame member 61, so as to be adjustable longitudinally thereon, is the base 251 of a bearing 252 in which a short transverse trigger lock rocker shaft 253 journals. On its inner end, this shaft has an upwardly extending arm 254 and on its outer end an arm 255 these being shaped and respectively angled as shown in FIG. 9. The arm 254 is spring biased by a spring 256 to rotate shaft 253 in a clockwise direction to bring the arm 255 into engagement with an adjustable stop 257.

This stop is mounted on a horizontal arm 258 formed integral with the base 251.

Mounted in the end of arm 255 is a screw 259 which extends through a slot 265 in the rear end of a trigger lock link 266. The front end of this link is pivotally connected to the end of arm 243 on trigger shaft 242 and is biased downwardly by a coil spring 267 which connects this to the frame member 61. When the arm 255 is turned down against the stop 257 and the link 266 is pulled forward to the limit of the slot 265, through which the screw 259 passes, the connection of the front end of link 266 with the arm 243 of shaft 242 holds that shaft in the position in which it is shown in FIG. 19 in which the trigger 245 is positioned in the path of the biased lug 241 of the clutch 238 so as to disengage this clutch at the completion of a single revolution of the shaft 237.

Figure 18:
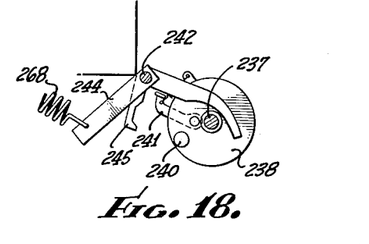
FIG. 18 is a view similar to FIG. 17 showing the trigger shaft rotated in a clockwise direction to remove the trigger from clutch disengaging position and thus cause the clutch to become engaged.

The trigger shaft 242 is constantly biased clockwise by a spring 268, connected to the lever 244 and to the frame 38, so that whenever shaft 253 is rotated to swing the arm 255 upwardly over dead center, the spring 268 is powerful enough to pull link 266 forwardly and swing trigger 245 out of its position intercepting the clutch arm 241 to cause the clutch to become engaged, as shown in FIG. 18. After the clutch becomes engaged, the roller 240 on the clutch 238 is brought, by rotation of the clutch, into engagement with clutch resetting cam 246 which rotates shaft 242 in a counter-clockwise direction thereby shifting trigger-lock-link 266 to its rearmost position, thereby freeing the rocker shaft 253 so that the spring 256 on arm 254 may rotate shaft 253 clockwise and return the outer arm 255 thereon into contact with the stop 257. Thus, when the resetting roller 240 of clutch 238 rides out of contact with the resetting cam 246 on shaft 242, the link 266 retains the shaft 242 with the trigger 245 in clutch disengaging position as shown in FIG. 19.

Fixed on the frame members 61 and 62 (FIGS. 1 and 3) is a diagonal angle iron 269. Pivotally mounted on its left end is a triangular rocker 270 one free corner of which is pivotally connected to a rod 271 which leads forwardly to a safety latch (not shown) which forms no part of this invention, and the other free corner of rocker 270 is pivotally connected to a rod 272 the opposite end of which has an adjustable clevis 273 which is pivoted to the rear end of a horizontal lever 274 having a cam head 275 at its outer end which lies in the path of a roller 276 which extends downwardly from the yoke 227. The roller 276 engages the cam head 275 when the yoke 227 is in an inoperative position as shown in FIG. 1, and disengages this cam head when yoke 227 is engaged in a wire binding operation, as shown in FIG. 3, thereby permitting the rocker 270 to rotate and the rod 271 to release the safety latch which is designed to prevent the plunger 37 damaging the needles 226 in case these should not be removed from the path of the plunger at the conclusion of a wire binding operation, as they normally are.

Welded on the upper longitudinal frame member 61 (FIGS. 2 and 3) is a short plate 280 having a horizontal slot 281 therein. Welded on the lever 274 is a short arm 282 which is apertured to slidably receive a rod 283 having a set collar stop 284 and an eye 285 and connecting at its opposite end to a flat bar 286 which is slidably received in the slot 281. Extending upwardly from the bar 286 is an inverted U-shaped keeper 287. Connecting the short arm 282 to the eye 285 is a contractile spring 288.

The forward end of push rod 188 is slidably received by the keeper 287 and the action of roller 276 on lever 274 is such that when the wire binding mechanism 194 is inactive, as shown in FIG. 1, the keeper 287 shifts the push rod 188 inward to a position directly alongside the rocker arm 254 as shown in FIG. 1. This positions a dog 289, which is mounted by screws 290 on the push rod 188 for longitudinal adjustment thereon, in radial alignment with arm 254 and directly behind this arm, so that forward movement of the rod 188 resulting from the swinging of the arm 186 as heretofore pointed out, moves the dog 289 against the arm 254 and rocks the shaft 253 so as to break the lock previously existing due to the position of the arm 255 against stop 257, and triggers the initiation of an operating cycle of the bale wire binding mechanism 194.

The mechanism 194 also includes a wire cutting, gripping and twisting mechanism 294 which is only diagrammatically shown in the drawings and which cooperates with the needles 226 to complete the encirclement of a bale B, formed in the baling chamber 39, with a set of three baling wires 295, the twisting of the ends of these wires, the cutting of these wires from the wire thus fed from the reels, and the gripping of the free ends of these wires so that as the needles 226 withdraw from the baling chamber they will leave a set of three new wires extending across the chamber in the path of the next bale to be formed, and which will give way as the hay is fed by the plunger 37 to the baling chamber so that these wires will encircle the new bale and be ready for tying when the bale is completed.

Fixed on the upper end of the yoke 227 is a plate 296, the extremity of which pivotally connects with a link 297 including a threaded rear end 298 which screws into an adjustable clevis 299 which is pivotally connected to the up-bent end 300 of a toggle release bar 301, the latter slidably extending through hole 92 and keeper 93 (see FIG. 5) and having fixed thereon bearing means 302 for rotatably supporting a roller 303. The roller 303 is so located on the bar 301 that when the wire binding mechanism 194 is not operating (FIG. 1) the roller 303 is disposed in a forward position as shown by broken lines 304. Rotation of the needle yoke 227 in performing a wire binding cycle shifts the link 297 rearwardly which causes the roller 303 to slide rearward under the pivoted cam 124 until the latter drops back in front of the roller as shown in FIG. 5. During the second half of the cycle of operation of the wire binding mechanism 194, the link 297 is drawn forwardly and this brings the roller 303 underneath the cam 124 so as to lift this and with it the toggle member 121 of the toggle 122 so as to shift the bolt 119 upwardly past dead center between the bolt 91 and the shaft 109 thereby freeing the pressure responsive mechanism 50 from the restraint imposed by the toggle and allowing this mechanism to respond to the pressure thereagainst of a new bale being formed, whereby it swings rapidly upward about its bearings 97. The pressure imposed by a new bale on the pressure responsive mechanism 50 is so intense that the retarding action of the dash-pot 128 is required to decelerate the rotation of the pressure responsive mechanism 50 about its bearings 97 to bring this rotation to a stop when the said mechanism is disposed upwardly approximately as shown in FIG. 6. The dash-pot 128 functions during the upward swinging of the pressure responsive mechanism to retard this swinging movement by compelling oil in the cylinder 134 to be expelled therefrom into the reservoir 136 by passing through the small orifice 142 in the flap valve 139. When the pressure responsive mechanism starts to swing downwardly, however, the flap valve 139 readily opens so that the dash-pot 128 offers little resistance to said mechanism returning by gravity to its normal position shown in FIGS. 1 and 2 and, when so returning, to swing the trap door 54 back up into its normal position shown in FIGS. 2 and 5.

*Operation*

The operation which was briefly described in the brief description of the figures with reference to FIGS. 10 to 16 inclusive will now be described in detail.

FIGS. 1 and 2 show the parts of the machine before it is placed in use. To start a baling run, the secondary pressure plate 59 is swung from the position shown in FIG. 2 to a transverse position in which the extension of bar 202 to the left engages frame upright 65, the bars 203 at this time engaging the corresponding frame upright 66 on the right side of the machine. The strut 60 is now inserted in place substantially as shown in FIG. 5 to space the plates 59 and 49 and transmit pressure from the plate 59 to the piston rod 157 of the pressure responsive mechanism 50. At this time the annular stop 158 (FIG. 5) is in engagement with the inner end of tube 164 and oil under high pressure is being supplied to the pressure chamber of cylinder 155 through the oil line 195—196.

Before starting the run, the link 266 is manually lifted upwardly so as to trigger the wire binding mechanism 194 to go through a binding cycle which will deliver a set of three baling wires 295 across the baling chamber 39 for use in baling and binding the initial new bale to be formed in the machine. These three wires are fed across the chamber by the needles 226 and gripped by the cutting, gripping and twisting mechanism 294 shown diagrammatically in FIGS. 1, 2 and 3.

Figure 11:
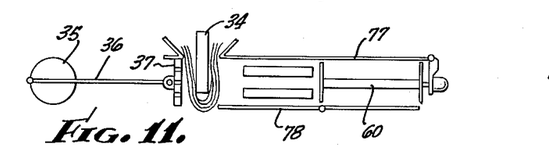
FIG. 11 is a view similar to FIG. 10 showing the baling plunger retracted in the first stroke of its operation and with a quantity of hay pushed downwardly in the compressing path of the plunger.
Figure 12:
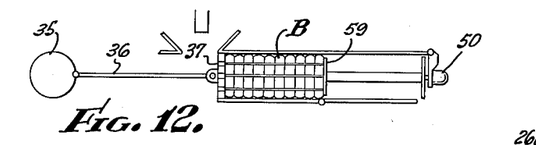
FIG. 12 is a view similar to FIG. 11 illustrating the completion of the final stroke of the plunger in the formation of an initial new bale by the baler of the invention. In the operation of the baler this stroke of the plunger applies sufficient pressure through the initial new bale and the secondary pressure plate and the compression strut connecting the latter to the pressure responsive mechanism at the discharge end of the baler to operate through the latter to trigger the wire binding mechanism of the invention to wire bind said initial new bale as the plunger starts to retract from the position shown in this view.

The machine 30 is now towed behind a tractor and headed into a windrow of hay so that the hay elevator (not shown) lifts this hay and the transverse conveyor (not shown) conveys it continuously into the hopper 33 shown diagrammatically in FIGS. 10 to 16 inclusive. The conduition of the baler 30 at this time is diagrammatically shown in FIG. 10. FIGS. 11 and 12 show how flakes of hay are formed and successively delivered by the plunger 37 to the baling chamber so as to compress these together with such a pressure as will form a bale of the desired density, the desired length of bale being determined by the location of the secondary pressure plate 59 approximately at the midpoint of the chamber 39. The pressure used in forming this initial bale is transmitted of course through the strut 60 to the piston rod 157 of the pressure responsive mechanism 50 with the result that when this pressure exceeds the given maximum required to form the bale, the piston 156 will move to the right, reducing the capacity of the pressure chamber of the cylinder 155 and driving some of the oil out of this chamber into the supply system. The amount of this travel of the piston 156 may be noted by observing the position shown for the annular stop 158 in FIG. 5 and its spacing from the inner end of tube 164. This response of the mechanism 50 rotates the vertical shaft 180 in a clockwise direction thereby swinging the arm 186 on the upper end of the shaft forwardly and shifting the push rod 188 so as to push the dog 289 against the inner arm 254 of the rocker shaft 253 thereby rotating this to break the lock formed by the arm 255 on the outer end of the shaft and allow the link 266 to be drawn forwardly by the spring 268 (FIGS. 1, 17, 18 and 19) and rotating the trigger shaft 242 from the position in which it is shown in FIG. 17 to the position in which it is shown in FIG. 18, thus engaging clutch 238 and starting a cycle of operation of the wire binding mechanism 194.

As above pointed out, this cycle is performed by the swinging of the frame yoke 227 through an angle of 90° and then the return of this yoke to its original position as shown in FIG. 1. This feeds three new wires 295 across for the formation of a subsequent new bale, completes the encirclement of the bale just formed by its wires and accomplishes the cutting and twisting of these to tightly bind said bale. The new bale B thus formed remains under pressure until its wires 295 are completely tied. As the yoke 227 returns to its original position, the link 297 pulls forwardly on the bar 301 which applies the roller 303 to the bottom of the rockable cam 124 so as to shift this upwardly and break the over-center lock by which the toggle 122 retains the pressure responsive mechanism 50 in its downward position in which it pressurably confines the bale B in the front half 45 of the baling chamber 39.

Figure 13:
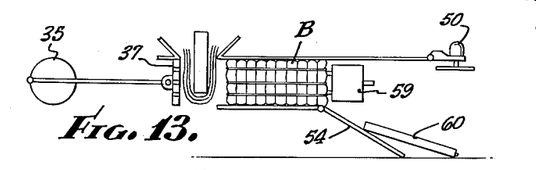
Figure 14:
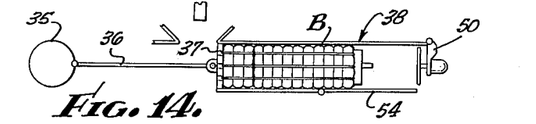
FIG. 14 is a view similar to FIG. 13 and illustrates the partial completion of another new bale by pressing the initial new bale along the baling chamber partially past the secondary pressure plate of the invention. This view also shows the pressure responsive mechanism and the trap door of the invention returned to their normal positions in the baler of the invention.
Figure 15:
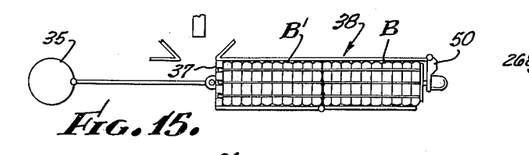
FIG. 15 is a view similar to FIG. 14 and shows the completion of the plunger stroke which completes the feeding of material in the formation of the second new bale shown as being formed in the baler of the invention.

With the breaking of toggle 122 in this manner, the pressure responsive mechanism 50 swings upwardly, retarded by the dash-pot 128 until positioned substantially as shown in FIG. 6. (The latter view illustrates completing a second bale B' as it shows the initial new bale B formed in the machine being discharged from over the trap door 54.) When the initial bale is completed, however, as now being described, there is no bale in the rear end of the baling chamber and the wire binding of the bale B in the front half of the baling chamber merely results in the strut 60 being released and falling downwardly onto the ground (FIG. 13) and in the secondary pressure plate 59 swinging on its pivoted supports to a position to one side of the baling chamber as shown in FIGS. 2 and 13.

The operator now recovers the strut 60 and places it in a suitable rack provided therefor on the side of the machine (FIG. 1) and proceeds with the baling run.

Instead of being formed against the pressure plate 59, as just described for the initial new bale formed in the machine 30, each subsequently formed new bale is formed against the bale last previously formed by the machine which performs the function of a measuring bale and is forced rearward by the new bale until the measuring bale is located in the rear half 46 of the baling chamber 39. This condition is illustrated diagrammatically in FIG. 15 where initial bale B is shown in the second half of the baling chamber and a second new bale B' is shown in the first half of the baling chamber at the moment that the final delivery of hay to form bale B' by the plunger 37 has taken place.

As previously pointed out, during most of each cycle of operation of the wire binding mechanism 194 the roller 276 thereof is out of contact with the cam head 275 of lever 274 so as to cause the keeper 287 to shift the push rod 188 to the left so as to move the dog 289 out of registry with the rocker arm 254. This is done because when the mechanism 50 swings upwardly as shown in FIG. 6, the upper end of shaft 180 swings forwardly so as to push the dog 289 forwardly past the arm 254. The leftward shifting of the rod 188 therefore by the wire binding mechanism 194, while it is operating, is necessary to prevent a conflict between the dog 289 and the arm 254. At the conclusion of the cycle of operation of the wire binding mechanism 194, the push rod 188 is pulled back alongside the arm 254 with a yieldable pressure by the spring 288 so that when the mechanism 50 swings downwardly again to its normal position as shown in FIG. 2 the push rod 188 is pulled rearwardly and the dog 289 restored to its operative relation with the arm 254 in which it is shown in FIG. 1.

Figure 16:
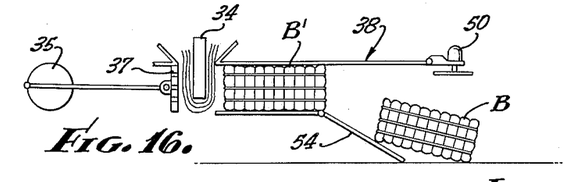
FIG. 16 is a view similar to FIG. 15 and illustrates the withdrawal of the plunger from its stroke above mentioned; the completion of the wire binding of the second new bale formed in the baler; the withdrawal of the pressure responsive mechanism from pressural relation with the first new bale formed and the simultaneous downward swinging of the trap door supporting said bale thereby discharging the first new bale onto the ground.

After the discharge of bale B as shown in FIGS. 6 and 16, the balance of the baling run of the baler 30 follows precisely the pattern formed in making the bale B'. Each bale such as B', after being formed and bound as shown in FIG. 16, becomes a pressure buffer for resisting the pressure of hay into the first half 45 of the baling chamber 38 and when it reaches the rear end 48 of the baling chamber it becomes a measuring bale for the new bale being formed at that time.

Hay is put up in bales of different standard sizes but a common size used in California is 18" x 22" x 44" and the drawings are approximately scale illustrations of a baler for making a bale of these dimensions. These are the measurements of the bale after it is discharged from the baler when it has expanded somewhat from its condition when compressed in the baling chamber. This expansion is almost entirely in the length of the bale, as will presently be seen.

Because of this expansion, the bale is considerably shorter than its final length when it is formed in the baler. Except when making the initial bale of a run, the baling chamber 39 must simultaneously accommodate each new bale being made, as it is being wire bound, and in tandem relation therewith, a measuring bale. These bales are made as nearly alike in content as possible, so that when discharged, and expanded, they are of like length and weight.

The second compression received by each bale when it is functioning as a measuring bale, particularly when it is not being laterally supported by pressure bars 52 as when first formed, has been found to make each measuring bale when it is under a second compression while forming a new bale, measure about one inch shorter in length than when it was originally formed in its first compression. It has also been discovered that a bale having the dimensions above noted, i.e. 18" x 22" x 44" when discharged, will result from bales initially formed in the baler 18" x 22" x 40".

In the operation of the baler 30, therefore, with the pressure bars 52 constricted approximately as shown in FIG. 3, the entire length of the baling chamber 39 is 79". This is considering the term "baling chamber" functionally as applying to the space displaced by the two tandem bales, as one of these is being wire bound, with the plunger 37 at its fully advanced position and with the pressure plate 49 yielded rearwardly about one inch in response to the final baling pressure of the plunger, so as to trigger the wire binding mechanism 194.

In preparing to form an initial bale to start the baling run, the compression strut 60 is therefore adjusted in length to space the pressure faces of the plates 49 and 59, 39" apart. The initial bale and each subsequent bale when first formed will be 40" long. When each bale is then forced into the second half of the baling chamber and employed as a measuring bale, it is further compressed to a length of about 39". At this time there is a substantial degree of slack in the wires 295 of this bale. Thus, upon discharge from the baler, it expands to a bale 44" in length, just in taking up this slack.

Experience indicates that the law of averages favors an automatic adjustment of variations in the length of any two bales consecutively produced by the baler 30. However, to meet any working conditions under which this might not result, an automatic mechanical means for correcting deviations from the normal length of the bales is provided and is disclosed herein in FIGS. 20–24 as a modified form of the baler 30. In this modified baler, the bale length adjuster provides a means for mounting the rear pressure plate on the piston rod of a hydraulic cylinder so that this plate will be automatically held forwardly in a position one-half inch closer to the front end of the baling chamber whenever a bale just formed in the front half of the baling chamber is as much as one-half inch shorter than the normal length of a bale in that position. When the bale, thus measured while it is in the front half of the chamber, reaches the back half of the chamber and engages the pressure plate, the pressure plate in its forwardly advanced position will stop the rearward movement of this bale with the front end of the bale directly where it would be if this bale were of normal length. Thus, the next bale formed when it is compressed against this bale at the rear end of the chamber, will be a normal length bale. This correction, having been made automatically, the baler will start making bales uniformly of normal length and will continue in this manner of operation until some abnormal feeding condition or the like might start a variation in the length of the successive bales. When this latter action progresses to the point where one of the bales produced is as much as one-half inch shorter than the normal bale length, the control mechanism of the modified form of the baler 30 to be presently described will function so as to restore the baler to uniformly producing bales exactly the normal length. After having made such a correction, the baler will run quite a long time, possibly indefinitely, before such a variation would re-occur, but if and when it does re-occur, the correction would be repeated as above noted.

An automatic bale-length adjusting device 309 to be incorporated with the baler 30 with no other changes in the structure or mode-of-operation thereof than those described hereinafter, is shown in FIGS. 20–25. This device includes a ball 310 provided on the front end of a cylinder 311 which fits slidably over the front end of a piston rod 312 of a hydraulic pressure responsive cylinder 313, and a pressure plate 314 is rockably mounted on the ball 310 by a socket 315 which surrounds the ball.

An O-ring 316 is provided in the front end of the rod 312 so that a sealed hydraulic chamber is caused to exist between the front end of this rod and the cylinder 311 to which oil is supplied through an axial hole 317 bored in the piston rod 312 and which communicates with a pipe 318 which extends through a slot 319 in one of the frame members 320 and connects with a hose 321. The cylinder 311 has a slot 322 through which a pin 323 extends downwardly and is mounted in a hole provided in the piston rod 312 so that this pin limits movement of the cylinder 311 on the piston rod to an axial movement of one-half inch. The pin 323 extends upwardly above the cylinder 311 through a slot 324 provided in a trigger actuating arm 325 which is welded onto a trigger actuating shaft 326.

Figure 23:
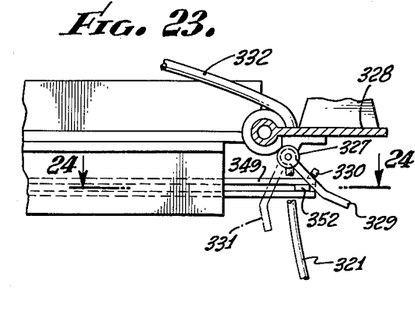
FIG. 23 is an enlarged fragmentary vertical sectional view taken on the line 23—23 of FIG. 22 and illustrates a control valve of said modified form of the invention which is controlled by said control arm.
Figure 24:
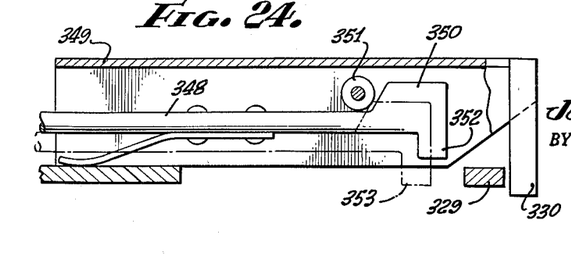
FIG. 24 is an enlarged diagrammatic horizontal sectional view taken on the line 24—24 of FIG. 23.
Figure 25:
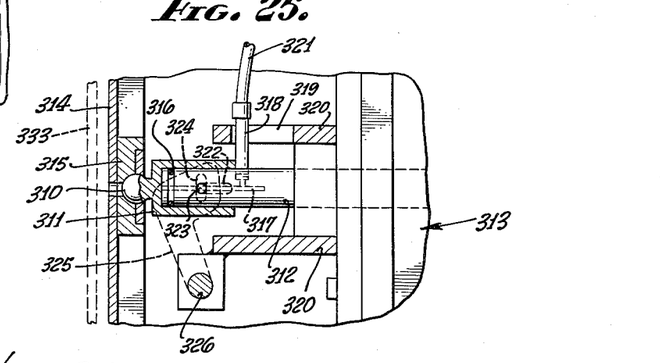
FIG. 25 is a fragmentary side elevational view of an automatic bale-length adjusting device of a modified form of the baler of the invention.

The hose 321 connects with a valve 327 which is mounted on a pivoted head 328 embracing frame members 320 and which carries the cylinder 313 so that the control arm 329 of this valve comes against a stop 330 whenever the head 328 swings upward at the completion of a baling cycle so as to swing the arm 329 into the broken line position 331 in which this arm is shown in FIG. 23 and in which the valve 327 is open thus allowing oil to flow downwardly through a hose 332 which connects to the reservoir 136 of the dash-pot 128 and then through the hose 321 into the cylinder 311 so that the weight of the pressure plate 314 will pull the cylinder 311 downwardly to the limit of the pin 323 in slot 322 so that the plate 314 will thus be advanced to broken line position 333 in which the plate is located one-half inch forwardly from its normal position which is shown in full lines in FIG. 25.

Now, when the baler is operating normally and producing bales of normal length in the front half of the baling chamber, the arm 329 of the valve 327 will remain in its position 331 at all times so that the valve 327 will remain open, and every time the cylinder head 328 swings upwardly at the completion of a baling cycle, the cylinder 311 will extend downwardly sucking oil into the chamber between this and the front end of the piston rod 312. As soon as a bale contacts the pressure plate 314, however, it will shift this from its position 333 to its normal rearward position as shown in full lines in FIG. 25 and the baler will thus function in its normal manner.

Figure 21:
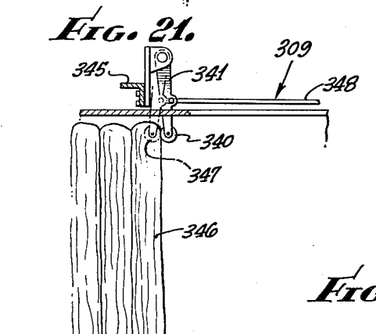
FIGS. 21 and 22 are composite diagrammatic horizontal sectional views taken on the line 21—21 of FIG. 20 and illustrating the linkage connecting said control arm to the baling pressure responsive mechanism of the invention.
Figure 22:
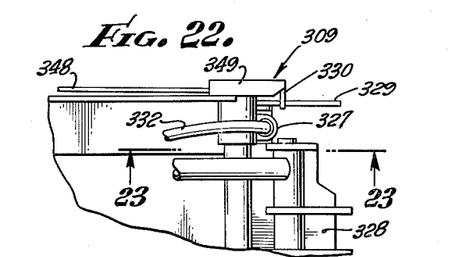

Whenever a bale just completed in the front half of the baling chamber is as much as one-half inch shorter than the normal length for a bale in this position, a roller 340 which is mounted on an arm 341 on a vertical shaft 342 fixed on a bracket 343 and constantly biased by a spring 344 tending to swing arm 341 so as to press roller 340 against the front end of a bale 346, the roller 340 will assume the broken line position 347 shown for this in FIG. 21. This will pull a rod 348 forwardly in a box 349 mounted on the rear corner of the frame of the baler so that a cam head 350 provided on the read end of rod 348 will engage a roller 351 thereby projecting a stud 352 into its broken line position 353, shown in FIG. 24, in which said stud will lie directly in the path of the valve arm 329 so that as the hydraulic cylinder head 328 swings downwardly, immediately following this action of the roller 340, the valve arm 329 will engage the stud 352 and will be swung into its full line position as shown in FIG. 23 in which the valve 327 will be shut off thereby trapping oil in the cylinder 311 and causing the pressure plate 314 to be retained in its advanced position 333 throughout the formation of the next bale.

This advancing of plate 314 one-half inch only during the making of the next bale, will compensate for the shortness of the measuring bale occupying the back half of the chamber and cause said next bale to be approximately normal length. Since when any bale of normal length is used as a measuring bale, the new bale produced will be of normal length, a uniform production of bales of normal length will follow the automatic bale length adjustment above described.

The production of a bale of normal length in the front half of the baling chamber always holds roller 340 in its full line position shown in FIG. 21, when the measuring bale is discharged. The bale length adjusting means thus remains inoperative as long as bales of normal length are being made.

The claims are:

1. In a baling machine, the combination of: means forming a baling chamber; means for pressing material to be baled into one end of said chamber to form a new bale in said chamber; a plate interposed in the path of said new bale and resisting longitudinal movement of said new bale in said chamber; means for wire binding said new bale; means responsive to the pressure imposed on said plate through said new bale, when said pressure exceeds a given value, to cause said wire binding means to bind said new bale; and means causing said plate to automatically yield from its position of resisting longitudinal movement of said bale, upon the binding of said bale being completed.

2. In a baling machine, the combination of: means forming a baling chamber approximately twice the length of a bale to be formed therein, while still confined therein, said chamber having a receiving end and a discharge end; means for pressing material to be baled into the receiving end of said chamber for forming a new bale in said chamber; a primary pressure plate interposed in the path of said new bale but located at the discharge end of said chamber, so that a previously completed bale positioned in said chamber between said new bale and said plate will transmit pressure from said new bale to said plate; means for wire binding said new bale; means responsive to the pressure thus imposed on said plate exceeding a given maximum value to cause said wire binding means to bind said new bale; and means causing said plate to automatically yield from its pressural engagement with said previously completed bale, upon the binding of said new bale being completed.

3. A combination as in claim 2 in which means is provided for supporting said previously completed bale from beneath during the formation of said new bale; and means operating automatically in timed relation with and subsequent to the binding of said new bale to release said supporting means thereby causing said previously completed bale to be gravitationally discharged downwardly from said baling chamber.

4. A combination as in claim 2 in which a secondary pressure plate is provided for disposal at the midpoint in said chamber; and strut means for transmitting pressure from said secondary pressure plate to the pressure responsive means associated with said primary pressure plate, whereby an initial new bale may be formed in said machine without having a previously completed bale in said baling chamber.

5. A combination as in claim 4 in which said secondary pressure plate is hingedly mounted for swinging out of said baling chamber and out of the path of subsequent bales formed therein, with the removal of said strut means.

6. In a baling machine, the combination of: means forming a baling chamber approximately twice the length of a bale to be formed therein, a first half of said chamber being at the receiving end thereof, the second half of said chamber being at the discharge end thereof; means for pressing material to be baled into the receiving end of said chamber for forming a new bale in said chamber; pressure responsive means pivotally mounted on a horizontal axis above the discharge end of said baling chamber and extending downward therefrom; a primary pressure plate mounted on said pressure responsive means and normally disposed in the plane bounding the discharge end of said chamber; toggle means holding said pressure responsive means against rotating about said axis, whereby a completed bale positioned in said chamber between said new bale and said plate will transmit pressure from said new bale to said plate; means for wire binding said new bale; a trap door for supporting said previously completed bale in the second half of said chamber; means connecting said pressure responsive means to said wire binding means to cause the latter to bind said new bale when the pressure against said plate exceeds a given maximum value; and means automatically operative in timed relation with and subsequent to said binding operation to relax said toggle means, thereby releasing said plate from pressural engagement with said previously completed bale, said toggle relaxing means simultaneously releasing said trap door thereby causing said previously completed bale to gravitate from the second half of said baling chamber.

7. A combination as in claim 6 in which said pressure responsive means and said trap door are counterbalanced against each other whereby they return to their original positions by gravity causing the relocking of said toggle means, following the discharge of said previously completed bale.

8. A combination as in claim 7 in which dash-pot means is provided to retard rotation of said pressure responsive means about said axis when said toggle means is relaxed whereby the center of gravity of said pressure responsive means does not swing upwardly over said axis, the weight of said pressure responsive means thus substantially counterbalancing said trap door and returning the latter upward to its normal bale supporting position, when said previously formed bale has been discharged.

9. A combination as in claim 2 in which means is provided which measures the length of said new bale, after it has been wire bound, and, in case it is found to be abnormal, temporarily readjust the length of said baling chamber for the immediately following bale forming operation in which said new bale shall serve as a measuring bale, to correct the length of the next subsequently formed new bale.

References Cited in the file of this patent

UNITED STATES PATENTS

| | | |
|---|---|---|
| 764,926 | Dederick | July 12, 1904 |
| 777,474 | Jones et al. | Dec. 13, 1904 |
| 1,043,041 | Bryan | Oct. 29, 1912 |
| 1,076,834 | Lamar | Oct. 23, 1913 |
| 1,536,562 | Chipman | May 5, 1925 |
| 1,757,813 | Simpson | May 6, 1930 |
| 2,158,745 | Dalimata | May 16, 1939 |
| 2,575,672 | Miller | Nov. 20, 1951 |
| 2,576,784 | Dodds et al. | Nov. 27, 1951 |
| 2,627,802 | Whiteside | Feb. 10, 1953 |
| 2,711,687 | Hollyday | June 28, 1955 |
| 2,803,186 | Garcia | Aug. 20, 1957 |
| 2,882,813 | Nelson et al. | Apr. 21, 1959 |

FOREIGN PATENTS

| | | |
|---|---|---|
| 21,553 | Germany | May 17, 1883 |